United States Patent
Lin

(12) United States Patent (10) Patent No.: US 6,754,179 B1
(45) Date of Patent: Jun. 22, 2004

(54) REAL TIME CONTROL OF PAUSE FRAME TRANSMISSIONS FOR IMPROVED BANDWIDTH UTILIZATION

(75) Inventor: Liang-i Lin, Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 750 days.

(21) Appl. No.: 09/595,002

(22) Filed: Jun. 13, 2000

(51) Int. Cl.[7] .......................... H04L 12/26; H04L 1/00; H04L 3/14

(52) U.S. Cl. ....................... 370/235; 370/236

(58) Field of Search ................. 370/235, 236, 370/242, 244, 245, 252, 445, 447, 448

(56) References Cited

U.S. PATENT DOCUMENTS

| | | | | |
|---|---|---|---|---|
| 4,890,224 A | * | 12/1989 | Fremont | 710/11 |
| 5,673,254 A | * | 9/1997 | Crayford | 370/231 |
| 6,026,075 A | * | 2/2000 | Linville et al. | 370/236 |
| 6,167,029 A | * | 12/2000 | Ramakrishnan | 370/235 |
| 6,170,022 B1 | * | 1/2001 | Linville et al. | 710/29 |
| 6,405,258 B1 | * | 6/2002 | Erimli et al. | 709/235 |
| 6,529,521 B1 | * | 3/2003 | MacArthur | 370/463 |
| 6,618,357 B1 | * | 9/2003 | Geyer et al. | 370/236 |
| 6,633,585 B1 | * | 10/2003 | Ghanwani et al. | 370/468 |

\* cited by examiner

*Primary Examiner*—Wellington Chin
*Assistant Examiner*—Mark A Mais
(74) *Attorney, Agent, or Firm*—Sawyer Law Group LLP

(57) ABSTRACT

A method for improving bandwidth utilization in a packet-switched network via real time control of pause frame transmissions. The invention provides a mechanism whereby a pause frame may be effectively negated if, during the transmission of the pause frame, the network conditions necessitating the pause frame are eliminated or abated. In one Ethernet-compliant embodiment of the invention, monitoring circuitry is provided in a network device to ascertain changes in flow control conditions. Following detection of a flow control condition (e.g., a transmit buffer overflow condition), a flow control unit in the network device initiates transmission of a pause frame. Typically, the initial pause time value will be set to a maximum value (e.g., "FFFF"). During or immediately prior to transmission of the pause frame, the monitoring circuitry functions to monitor the state of the flow control unit or flow control enablement signals to determine if the flow control condition remains in effect. If the monitoring circuitry determines that the flow control condition has been negated, the status of the pause frame transmission is then determined. If the pause time value has not been transmitted, the monitoring circuitry causes a reduced pause time value (e.g., "0000") to be transmitted, thereby effectively negating potentially deleterious effects on network bandwidth that might otherwise result from the original pause frame. In an alternate embodiment of the invention, if the monitoring circuitry determines that the flow control condition giving rise to the pause frame has been negated, the frame check sequence/cyclic redundancy check value at the end of the pause frame is invalidated.

20 Claims, 4 Drawing Sheets

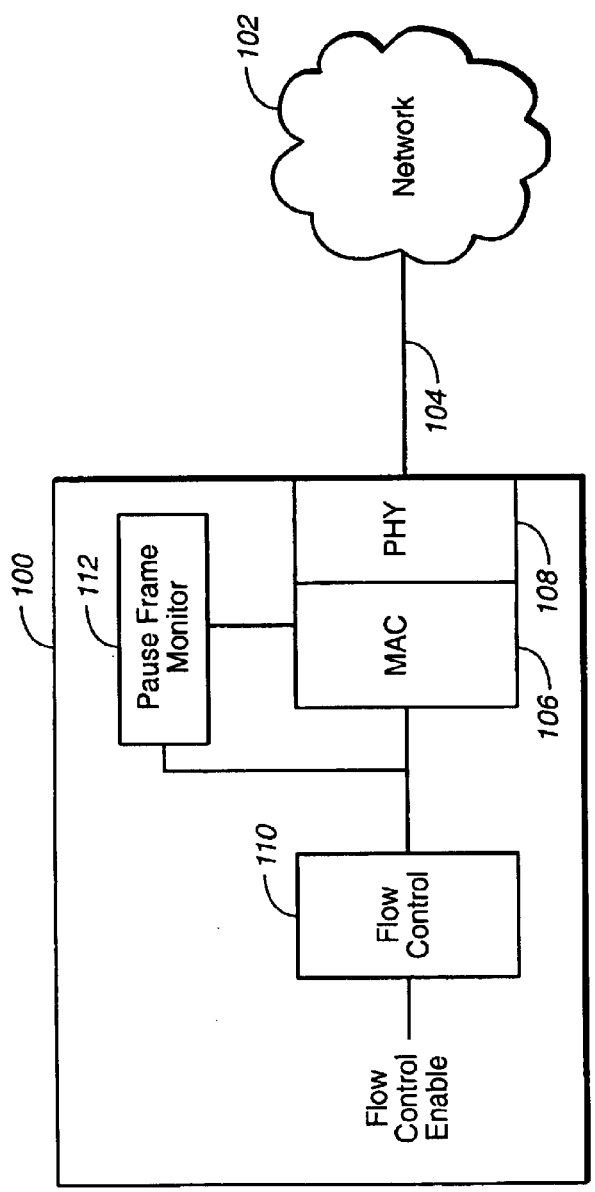
FIG._1
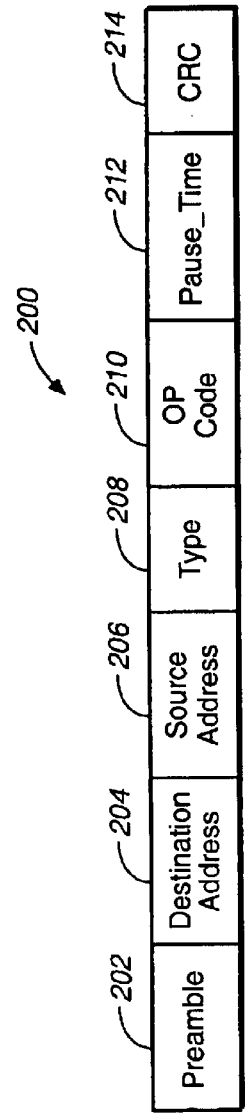
FIG._2

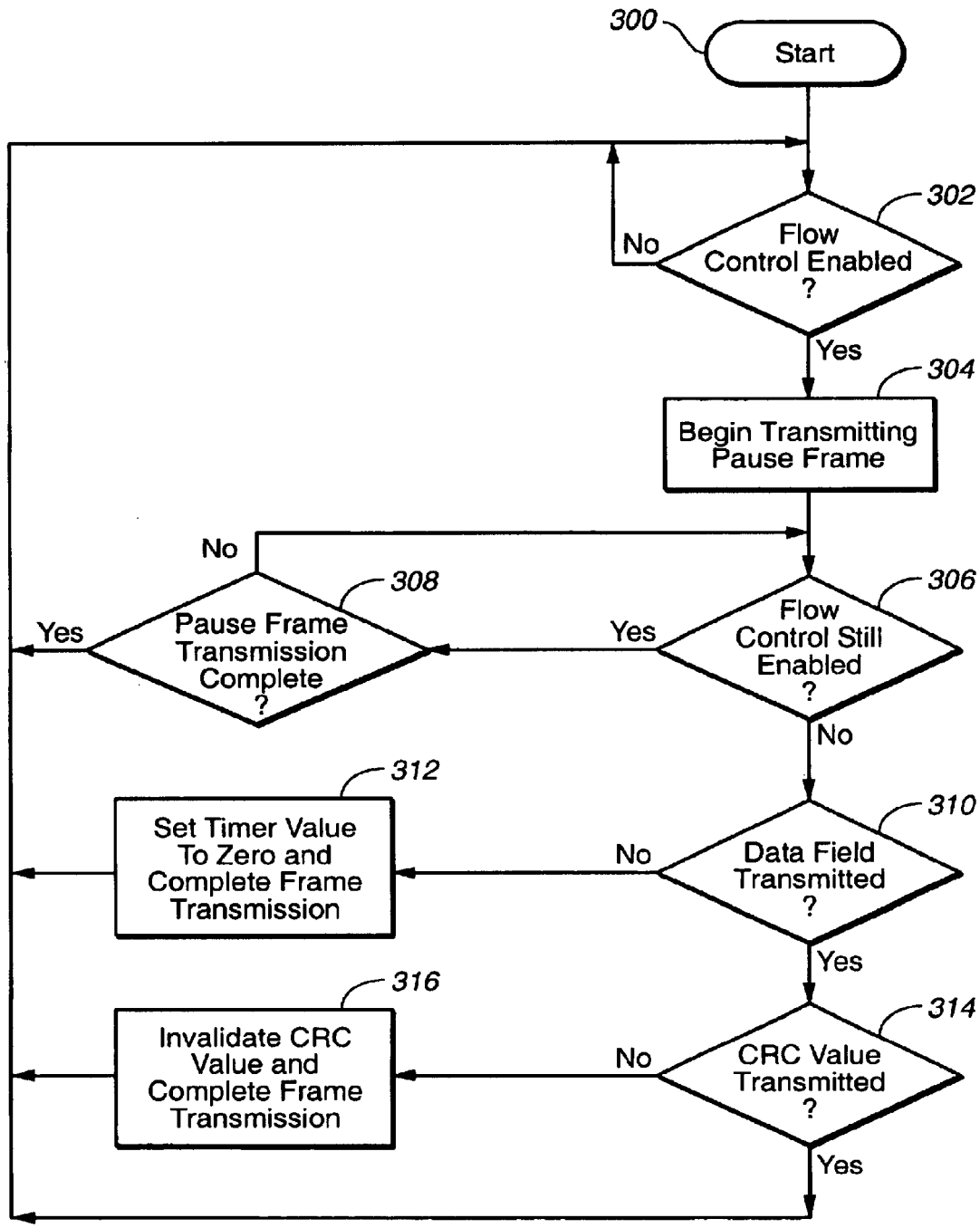
FIG._3

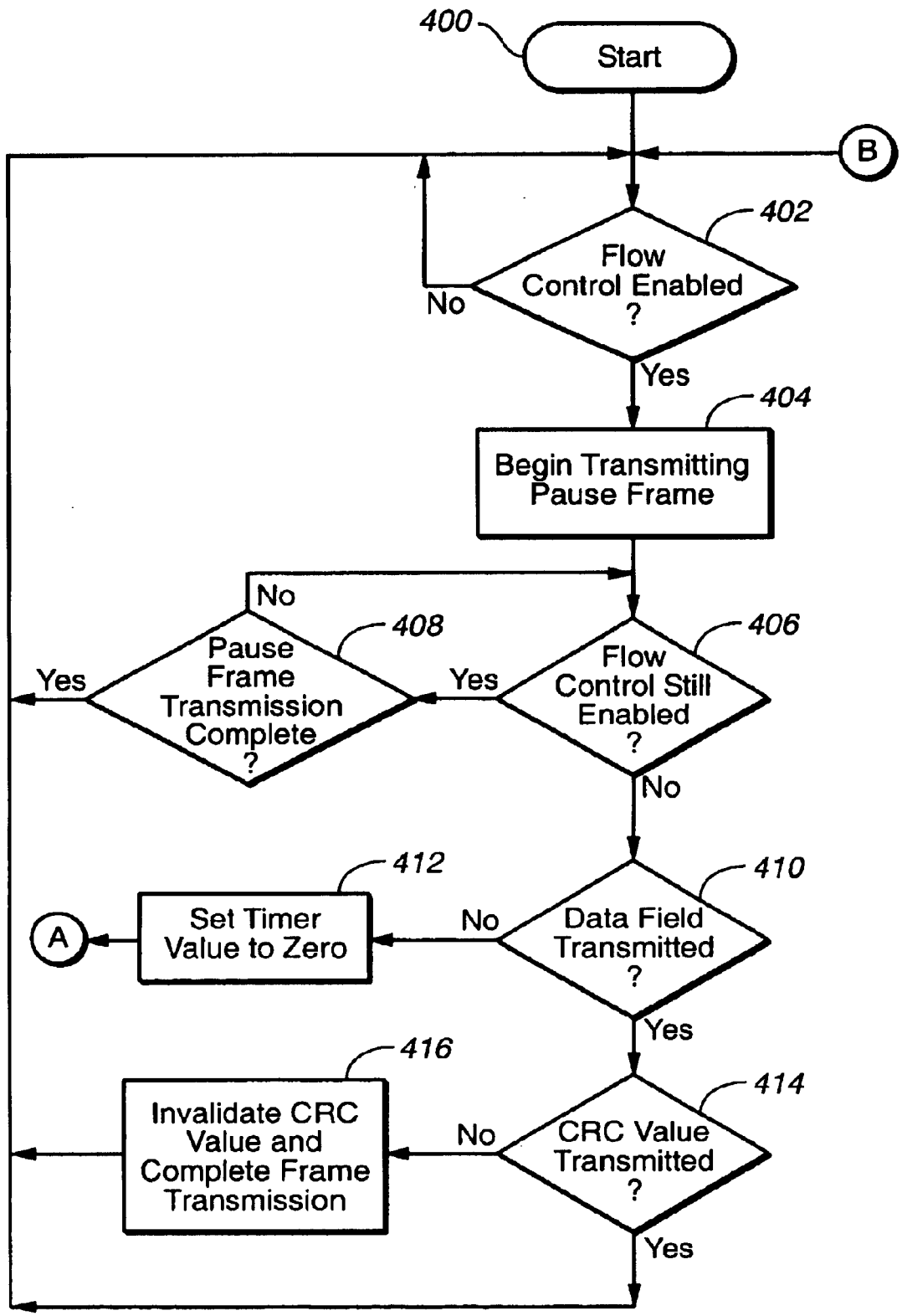
FIG._4A

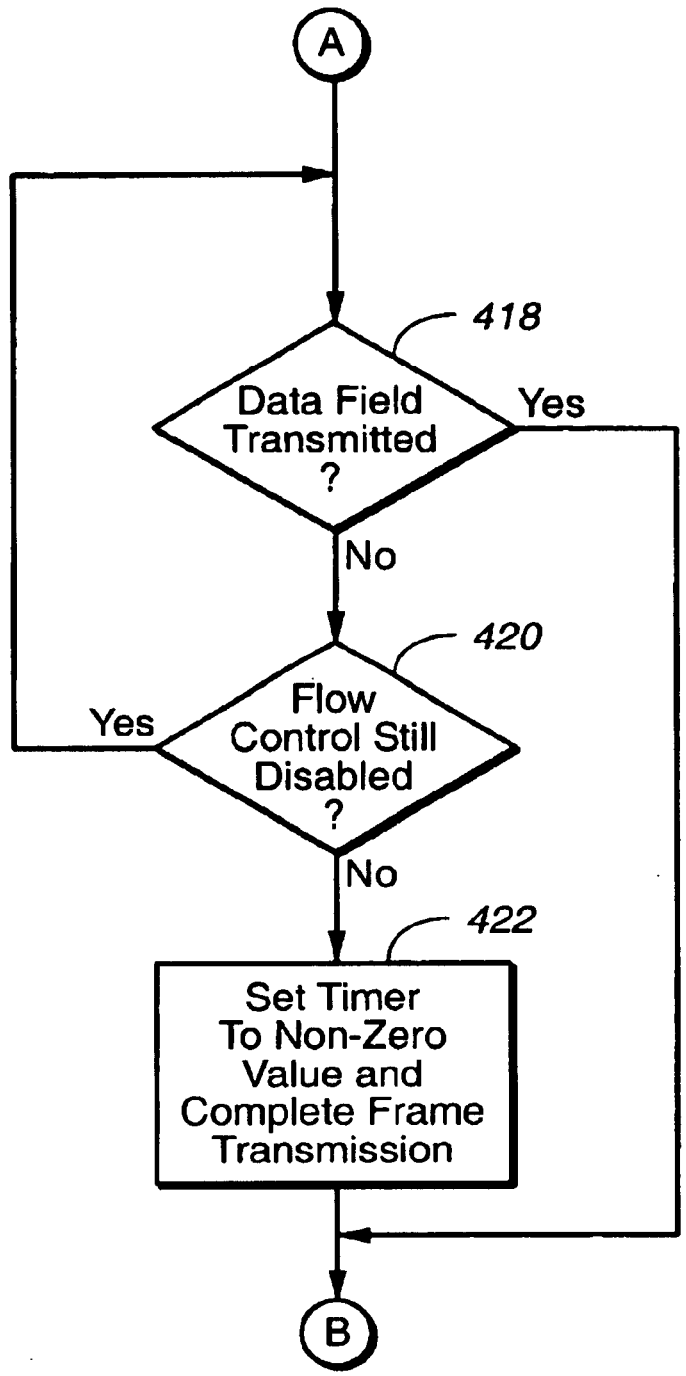
FIG._4B

US 6,754,179 B1

REAL TIME CONTROL OF PAUSE FRAME TRANSMISSIONS FOR IMPROVED BANDWIDTH UTILIZATION

FIELD OF THE INVENTION

The present invention relates generally to computer networking; and, more particularly, it relates to improving bandwidth utilization in a packet-switched network via real time control of pause frame transmissions.

BACKGROUND OF THE INVENTION

Network devices generally adhere to an open systems interconnection (OSI) layered model developed by the International Organization for Standards (ISO) for describing the exchange of information between layers. The OSI layered model is particularly useful for separating the technological functions of each layer, and thereby facilitating the modification or update of a given layer without detrimentally impacting the functions of neighboring layers.

Multiple layers defined in the OSI model are responsible for various functions, including: providing reliable transmission of data over a network; routing data between nodes in a network; initiating, maintaining, and terminating a communication link between users connected to the nodes; performing data transfers within a particular level of service quality; controlling when users are able to transmit and receive data depending on whether the user is capable of full-duplex or half-duplex transmission; translating, converting, compressing, and decompressing data being transmitted across a medium; and providing users with suitable interfaces for accessing and connecting to a network. The lower portion of the OSI model includes a media access control (MAC) layer, which generally schedules and controls the access of data to a physical layer (PHY).

As the lower-most portion of the OSI model, the PHY layer is responsible for encoding and decoding data into signals that are transmitted across a particular medium, such as a cable. To enable transmission to a particular medium, the PHY layer also includes a physical connector that is configured and operable to receive the transmission medium.

Congestion is a potential problem in most networks. Congestion may occur if network devices attempt to simultaneously communicate too much data across a network. The bandwidth of the network can thus be exceeded, resulting in transmission errors, lost data and/or substantial delays in data transmission. Congestion is typically controlled by sensing the traffic in the network at the various nodes, sending special information packets between nodes to notify the other nodes of the magnitude and type of congestion, and delaying transmission of data at specified nodes in accordance with a predetermined flow control mechanism.

Flow control may be enabled by signals generated by a variety of modules or mechanisms. For example, a relatively large amount of packet traffic over a particular port in a switch or similar receiving device may cause the transmit queue associated with that port to reach a predetermined threshold value. In this situation, the switch generally instructs the transmitting device to delay communications such that information in the transmit queue may be sent. In Ethernet/IEEE 802.3x-compliant systems, the switch sends a "pause" frame to the transmitting device. The pause frame contains a parameter field specifying a pause time value directing the transmitting device to inhibit transmissions for the specified amount of time. If congestion eases before the expiration of the specified amount of time, the switch may resume normal communications by sending a second pause frame with a pause time value of zero.

Under certain circumstances, the flow control condition requiring a pause frame may change immediately before or during the transmission of the pause frame. In existing systems, however, there is no mechanism for nullifying the pause frame once transmission has begun. Instead, the flow control module must trigger a remedial pause frame with a pause time of zero to neutralize the pause frame that was just sent. In addition, a network device receiving the initial pause frame may be required to respond, further reducing the amount of bandwidth available for data transmissions.

SUMMARY OF THE INVENTION

Briefly, the present invention relates to a method and circuitry for improving bandwidth utilization in a packet-switched network via real time control of pause frame transmissions. The invention provides a mechanism whereby a pause frame may be effectively negated if, during the transmission of the pause frame, the network conditions necessitating the pause frame are eliminated or abated.

In one Ethernet-compliant embodiment of the invention, monitoring circuitry is provided in a network device to ascertain changes in flow control conditions. Following detection of a flow control condition (e.g., a transmit buffer overflow condition), a flow control unit in the network device initiates transmission of a pause frame. Typically, the initial pause time value will be set to a maximum value (e.g., "FFFF"). During or immediately prior to transmission of the pause frame, the monitoring circuitry functions to monitor the state of the flow control unit or flow control enablement signals to determine if the flow control condition remains in effect. If the monitoring circuitry determines that the flow control condition has been negated, the status of the pause frame transmission is then determined. If the pause time value has not been transmitted, the monitoring circuitry causes a reduced pause time value (e.g., "0000") to be transmitted, thereby effectively negating potentially deleterious effects on network bandwidth that might otherwise result from the original pause frame.

In an alternate embodiment of the invention, if the monitoring circuitry determines that the flow control condition giving rise to the pause frame has been negated, the frame check sequence/cyclic redundancy check value at the end of the pause frame is invalidated. A network device(s) receiving such a frame will identify it as invalid and the frame will be discarded. This embodiment of the invention may be utilized, for example, if the initial pause time value has already been transmitted or is in the process of being transmitted when the flow control condition changes state. Further, the monitoring circuitry may be configured to cause the pause time value to revert to its original value should the flow control condition (or another flow control condition) be reasserted prior to completion of the pause frame transmittal. Various combinations of these embodiments may be utilized to maximize the performance of the system.

A network device implemented according to the present invention thereby maximizes bandwidth utilization and data throughput by transmitting fewer pause frames or pause frames specifying shorter pause time durations than conventional systems. In addition, the network device reduces or eliminates unnecessary responses from attached devices, resulting in improved performance for both out-going and incoming network traffic.

BRIEF DESCRIPTION OF THE DRAWINGS

A better understanding of the present invention can be obtained when the following detailed description of an exemplary embodiment is considered in conjunction with the following drawings, in which:

FIG. 1 is a schematic diagram of an exemplary network device incorporating capabilities for controlling pause frame transmissions in accordance with the present invention to improve network bandwidth utilization;

FIG. 2 is a diagram of the various frame fields of an exemplary pause frame transmitted by the network device of FIG. 1;

FIG. 3 is flow diagram of an exemplary pause frame transmission operation performed by the network device of FIG. 1 in accordance with the present invention; and FIGS. 4A and 4B are flow diagrams of an alternate pause frame transmission operation performed by the network device of FIG. 1 in accordance with the present invention.

DETAILED DESCRIPTION OF THE INVENTION

FIG. 1 is a schematic diagram of an exemplary network device 100 incorporating capabilities for controlling pause frame transmissions in accordance with the present invention to improve network bandwidth utilization. The network device 100 includes functionality permitting a pause frame to be effectively negated in response to changes in network congestion conditions or other "flow control" conditions. Unlike prior systems, the network device 100 permits a pause frame to be altered (e.g., by sending a reduced pause time value or invalid CRC value) during transmission such that changes to flow control conditions may be exploited in a timely manner. A network device 100 implemented according to the present invention thereby maximizes bandwidth utilization and data throughput by transmitting fewer pause frames or pause frames specifying shorter pause time durations than conventional systems. In addition, the network device 100 reduces or eliminates unnecessary responses from attached devices, resulting in improved performance for both out-going and incoming network traffic.

A network device 100 according to the present invention may take many forms including, by way of example, a switch, hub, repeater, bridge, or computer. The illustrated functionality may be further be located on a network interface card (NIC) or main circuit board in the form of one or more integrated circuits. In addition, one or more components of the illustrated network device 100, such as the pause frame monitor 112, may be implemented in either hardware or software.

It is envisioned that the network device 100 may be compliant with one or more Ethernet/IEEE 802/3x standards. For example, until fairly recently, common data transmission speeds over Ethernet networks were 10 megabits per second (Mbps). However, to meet the demand for faster data transmission speeds, the IEEE 802.3 Standards Committee introduced another standard—the IEEE 802.3u Standard—for a 100BASE-T system capable of performing data transmission at up to 100 Mbps. Yet another standard, capable of operating at up to 1 Gbps, has subsequently been introduced. When operating with unshielded, twisted pair (UTP) cable as a transmission medium, these networks are commonly referred to as 10BASE-T, 100BASE-T and 1000BASE-T (or Gigabit Ethernet) networks, respectively. Pause frames (such as the pause frame 200 described below in conjunction with FIG. 2) generated by the network device 100 may comply with any of these standards, or other existing or future communication standards utilizing pause frames.

Referring more specifically to FIG. 1, the network device 100 is communicatively coupled to a network 102 via a transmission medium 104. The transmission medium 104 may comprise thin coaxial cable, unshielded or shielded twisted pair cable, or fiber optic cable. Alternatively, the network device 100 may communicate wirelessly with the network 102. The network device 100 may be connected to a file server or any other type of network capable device.

The network device 100 of the disclosed embodiment comprises a MAC module or unit 106, PHY circuitry 108, a flow control module 110 and a pause frame monitor 112. The MAC unit 106 schedules and controls the access of data, including pause frames, to the PHY circuitry 108. The PHY circuitry 108 encodes and decodes data into signals that are transmitted across the transmission medium 104, and further includes the physical connector (not separately illustrated) to the transmission medium 104.

The transmission of pause frames to the network 102 is triggered by the flow control module 110 upon detection of a flow control condition. In the illustrated embodiment, flow control conditions are detected via the assertion of a flow control enable signal. The flow control enable signal may be asserted by any of a number of modules or tasks, some of which are indicative of network congestion conditions. These modules include, for example, configuration modules, memory index modules, mirror timer modules, and transmit task fifo modules. Processor interrupts, multitasking, and excessive network broadcasts are exemplary of flow control conditions that may necessitate transmission of pause frames. Typically, the flow control module 110 will trigger a pause frame when the transmission medium 104 is idle.

During or immediately prior to transmission of a pause frame, the monitor 112 functions to monitor the state of the flow control module 110 or flow control enablement signals to determine if a flow control condition remains in effect. If the monitor 112 determines that the flow control condition has been negated, the status of the pause frame transmission is then determined. As described more fully below, if the pause time value has not been transmitted, the monitor 112 causes the MAC unit 106 to transmit a reduced pause time value (e.g., "0000")—thereby effectively negating potentially deleterious effects on network bandwidth that might otherwise result from the original pause frame.

FIG. 2 is a diagram of the various frame fields of an exemplary pause frame (or packet) 200 transmitted by the network device 100 of FIG. 1. The pause frame 200 includes several frame fields, including a pause time field 212. The pause time field 212 specifies a variable amount of time for which a receiving node is requested to inhibit transmission of data. The described pause frame 200 is substantially compliant with an Ethernet standard.

The disclosed pause frame 200 comprises a preamble 202 that notifies a receiving node that a frame is being transmitted. Depending on the particular specification that is implemented, the preamble 200 may also include an additional "start-of-frame" byte that serves a synchronization function. The preamble 202 is followed by a destination address 204 and a source address 206. In general, the first few bytes of these addresses are specified on a vendor-dependent basis, while the last few bytes are specified by the vendor. The destination address 204 may be a unicast, multicast or broadcast address, while the source address 206 is a unicast (single-node) address. In general, MAC pause frames may only be transmitted by network devices that are configured for full-duplex operation.

The type field 208 identifies the pause frame 200 as a MAC control frame. The opcode field 210 further identifies the MAC control frame as a PAUSE frame. As previously noted, the pause time field 212 includes a value specifying a timer value for pausing transmissions. In one embodiment, the pause time value is measured in units of "pause_quanta", equal to 512 bit times. If the network device 100 transmits with a pause time set to 1000, a receiving node should inhibit transmission of frames for 512,000 bit times (1000×512). An exemplary range of pause time values is 0 to 65535 pause_quanta. Thus, the network device 100 may request, with one pause frame 200, that transmission be inhibited for 33,553,920 bit times (33.554 ms for Gigabit Ethernet).

The pause frame 200 also includes a Frame Check Sequence (FCS) or cyclic redundancy check (CRC) value 214. The FCS/CRC value 214 is typically a 4-byte value generated by the network device 100. The receiving node recalculates this value for purposes of verifying the integrity of a received pause frame 200. If the values do not match, the frame is discarded.

In a Gigabit Ethernet compliant system, the preamble 202 of the pause frame 200 is 7–8 octets in length, the destination address and source address 204 and 206 are each 6 octets in length, the type field 208 and opcode field 210 are each 2 octets in length, the pause time value field 212 is 2 octets in length (with another 42 octets being reserved), and the FCS/CRC field 214 is 4 octets in length. As will be appreciated by those skilled in the art, a system according to the present invention may readily be adapted to accommodate variations and enhancements to existing standards, and the precise lengths of the various portions of a pause frame 200 are not considered critical to the invention.

FIG. 3 is flow diagram of an exemplary pause frame transmission methodology performed by the network device 100 of FIG. 1 in accordance with the present invention. Following commence of the process in step 300, the flow control module 110 loops at step 302 until a flow control enable signal is asserted or a flow control condition is otherwise detected. The flow control module then triggers the transmission of a pause frame 200 in step 304. During the transmission of the pause frame 200, the monitor 112 monitors (step 306) the state of the flow control module 110 to determine if the flow control condition remains in effect. If so, control passes to step 308 to determine if the pause frame 200 has been completely transmitted. If not, the process returns to step 306. If the pause frame 200 has been sent, the process instead returns to step 302 to await transmission of the next pause frame 200.

If it is determined in step 306 that the flow control condition has been negated, the status of the pause frame transmission is then determined in steps 310 and/or 314. More particularly, the pause frame transmission is examined in step 310 to determine if the data field/pause time value has been transmitted. If the pause time value has not been transmitted, the monitor 112 causes a reduced pause time value (e.g., "0000") to be transmitted at step 312, thereby effectively negating the pause frame.

In this embodiment of the invention, if the pause time field value 212 has been transmitted as determined in step 310, the process proceeds to step 314 to determine if the FCS/CRC value 214 has been transmitted. If not, the monitor causes an interrupt to be generated, and an invalid CRC value 214 is transmitted in step 316. Again, transmission of an invalid CRC value 214 effectively negates the effects of the pause frame 200. Following either of steps 312 or 316, the process returns to step 302.

FIGS. 4A and 4B are flow diagrams of an alternate pause frame transmission methodology performed by the network device 100 of FIG. 1 in accordance with the present invention. In this embodiment of the invention, the monitor 112 is configured to cause the pause time value to revert to its original value should the flow control condition (or another flow control condition) be reasserted prior to completion of the pause frame transmittal.

Steps 400–416 of FIG. 4A correspond generally to steps 300–316 described above in conjunction with FIG. 3. However, following step 412, the process proceeds to step 418 (FIG. 4B) where the monitor 112 again determines if the pause time value has been transmitted. If not, the monitor 112 next determines if the flow control condition remains disabled. If so, the process loops back to step 418.

If the flow control condition has been reasserted as determined in step 420, the pause time value is returned to its original value in step 422 and the frame transmission is completed. Following either of step 422 or a determination in step 418 that the pause time value has been transmitted, the process returns to step 402.

Various combinations of and modifications to the foregoing embodiments of the invention may be utilized to maximize the performance of the system. Further, in another contemplated embodiment of the invention, the monitoring circuitry 112 may be configured to stop transmission of a partially transmitted pause frame 200. However, this approach may result in sending packets of an "illegal" length.

Thus, a method and circuitry for improving bandwidth utilization in a packet-switched network via real time control of pause frame transmissions has been described. The invention provides a mechanism whereby a pause frame may be effectively negated if, during the transmission of the pause frame, the network conditions necessitating the pause frame are eliminated or abated. A network device implemented according to the present invention thus reduces or eliminates unnecessary responses from attached devices, resulting in improved performance for both out-going and incoming network traffic.

In view of the above detailed description of the present invention and associated drawings, other modifications and variations will now become apparent to those skilled in the art. It should also be apparent that such other modifications and variations may be effected without departing from the spirit and scope of the present invention.

I claim:

1. A method for transmitting a pause frame in a network environment, comprising:
    initiating transmission of a pause frame following detection of a flow control condition, the pause frame having a pause time field containing a pause time value;
    monitoring the state of the flow control condition during transmission of the pause frame to determine if the flow control condition has been disabled; and, if so,
    determining if the pause time value has been transmitted; and if not,
    transmitting a reduced pause time value.

2. The method of claim 1, wherein the reduced pause time value is zero.

3. The method of claim 1, the pause frame having a frame check sequence/cyclic redundancy check field, further comprising:
    following detection of a disabled flow control condition, determining if the frame check sequence/cyclic redundancy check value has been transmitted; and if not,
    transmitting an invalid frame check sequence/cyclic redundancy check value.

4. The method of claim 1, further comprising:

prior to transmitting a reduced pause time value, verifying that the flow control condition remains disabled and, if not, transmitting a predetermined non-zero pause time value.

5. The method of claim 1, wherein the pause frame is substantially compliant with an Ethernet standard.

6. The method of claim 5, wherein the Ethernet standard is a Gigabit Ethernet standard.

7. The method of claim 5, wherein the Ethernet standard is a 100-Mbps Ethernet standard.

8. The method of claim 1, performed by a network interface card.

9. The method of claim 1, performed by circuitry on a primary circuit board.

10. A network device, comprising:

a media access control (MAC) unit;

a flow control unit coupled to the MAC unit, the flow control unit configurable to cause the MAC unit to generate a pause frame upon a predetermined condition(s), the pause frame having a pause time field containing a pause time value; and a monitor coupled to the MAC unit and the flow control unit for monitoring the state of the flow control unit during transmission of a pause frame, the monitor:
   determining if the flow control unit has been disabled; and, if so,
      determining if the pause time value has been transmitted; and, if not,
      causing the MAC unit to transmit a reduced pause time value.

11. The network device of claim 10, wherein the reduced pause time value is zero.

12. The network device of claim 10, the pause frame having a frame check sequence/cyclic redundancy check field, the monitor further:

following detection of a disabled flow control unit, determining if the frame check sequence/cyclic redundancy check value has been transmitted; and, if not, causing the MAC unit to transmit an invalid frame check sequence/cyclic redundancy check value.

13. The network device of claim 10, the monitor further:

prior to causing the MAC unit to transmit a reduced pause time value, verifying that the flow control unit remains disabled and, if not, causing the MAC unit to instead transmit a predetermined non-zero pause time value.

14. The network device of claim 10 further comprising a physical layer (PHY) unit for encoding data from the MAC unit for provision to a network medium.

15. The network device of claim 10, wherein the pause frame is substantially compliant with an Ethernet standard.

16. The network device of claim 10, wherein the flow control unit, MAC unit and monitor are integrated on a network interface card.

17. A communication circuit, comprising:

media access control (MAC) unit;

flow control circuitry coupled to the MAC unit for initiating the transmission of a pause frame upon detection of at least one predetermined condition, the pause frame having a pause time field containing a pause time value; and monitoring circuitry coupled to the flow control circuitry for monitoring the state of the at least one predetermined condition during transmission of a pause frame, the monitoring circuitry configured to:
   determine if the at least one predetermined condition still exists; and, if not,
   determine if the pause time value has been effectively transmitted; and, if not,
   cause the MAC unit to transmit a reduced pause time value.

18. The communication circuit of claim 17, the MAC unit, flow control circuitry and monitoring circuitry integrated onto a common substrate.

19. The communication circuit of claim 17, the monitoring circuitry further configured to:

following a determination that the at least one predetermined condition still exists and the pause time value has been effectively transmitted, determine if a pause frame check sequence/cyclic redundancy check field value has been transmitted; and, if not, cause the transmission of an invalid frame check sequence/cyclic redundancy check field value.

20. The communication circuit of claim 17, wherein the pause frame is substantially compliant with an Ethernet standard.

* * * * *